3,169,092
STABILIZATION OF AMINES BY TARTRAZINE
AND BISULFITE
Annmarie G. Petraglia, Bronx, and Lester C. Dick, Rye, N.Y., assignors to Richardson-Merrell Inc., New York, N.Y., a corporation of Delaware
No Drawing. Filed Sept. 26, 1963, Ser. No. 311,640
4 Claims. (Cl. 167—65)

This invention relates to the stabilization of aqueous solutions of aromatic amines, particularly sympathomimetic amines.

Sympathomimetic amines are often sold as dilute aqueous solutions for application to the mucous membranes. Some of the more important of these sympathomimetic amines are subject to oxidative degradation due to the influence of metal ions, heat, aeration, and light. Unless stabilized in some manner, these solutions turn dark and throw down heavy precipitate in a matter of a few weeks under room conditions. Usually it is recommended that the solution be discarded if it shows these signs of deterioration.

Sodium meta-bisulfite has proven to be the best of the anti-oxidants as a stabilizing agent for these solutions. Concentrations of from 0.1 to 0.2 percent are effective stabilizers but even these amounts of sodium meta-bisulfite are not entirely adequate. There is, therefore, a definite need for improved means of stabilizing aqueous solutions of sympathomimetic amines.

We have discovered that small amounts, 0.05 to 0.2 percent by weight of FD and C Yellow No. 5 Certified Dye, also known as tartrazine, is an effective stabilizer for the sympathomimetic amines alone or in combination with the usual amounts of sodium meta-bisulfite.

To illustrate the invention in greater particularity, reference may be made to several series of experiments.

A 2 percent solution of 1-phenylephrine hydrochloride in distilled water was prepared. One hundred milliliters of the solution was placed in a clear glass bottle which was tightly stoppered with a glass stopper and placed on a bench in the laboratory and maintained at room temperature for several months while exposed to normal sunlight. To another 100 milliliters solution of 1-phenylephrine hydrochloride was added 0.2 percent sodium meta-bisulfite. A third 100 milliliters aliquot of the 1-phenylephrine hydrochloride solution was mixed with 10 milliliters of a 0.1 percent solution of tartrazine. A fourth solution was prepared with 0.2 percent sodium meta-bisulfite and 10 milliliters of 0.1 percent solution of tartrazine. All solutions were placed in glass stoppered, clear glass bottles and placed in the sunlight. These bottles were examined from time to time with the results shown in the following table.

Table I

| Solution | Days Exposure Sunlight, Room Temperature | | |
|---|---|---|---|
| | 39 | 46 | 71 |
| 1-phenylephrine, 2.0% | Colored ppt. forming. | Dark ppt. | Darker ppt. |
| 1-phenylephrine, 2.0%; Na Meta-bisulfite, 0.2%. | Sl. purple, no ppt. | Darker ppt. | Very dark copious ppt. |
| 1-phenylephrine, 1.8%; Tartrazine, 0.009%. | Sl. color, no ppt. | Sl. color, no ppt. | Darker, no ppt. |
| 1-phenylephrine, 1.8%; Na Meta-bisulfite, 0.2%; Tartrazine, 0.009%. | Stable, no ppt. | Stable, no ppt. | Stable, no ppt. |

As will be seen from the above results, the solution of unstabilized 1-phenylephrine commenced to turn color and threw out a precipitate within thirty-nine days. The solution stabilized with sodium meta-bisulfite turned purple but no precipitate had commenced to form on the thirty-ninth day. The solution stabilized with the tartrazine had developed only a slight darkening of color and no precipitate had formed. The solution stabilized with both sodium meta-bisulfite and tartrazine was stable with no evidence of color darkening or precipitation.

On the seventy-first day the solution stabilized with the sodium meta-bisulfite had a very dark purple color and a copious precipitate had formed. The solutions stabilized with tartrazine had a purple color but no precipitate had formed. The solution stabilized with both tartrazine and sodium meta-bisulfite showed no evidence of deterioration. These results show that tartrazine is a better stabilizer for 1-phenylephrine than is sodium meta-bisulfite and that a combination of sodium meta-bisulfite and tartrazine is better yet.

Similarly, a series of experiments was run with the exposure being at 45° C. This series of experiments revealed that sodium meta-bisulfite is more effective as a stabilizer for 1-phenylephrine at 45° C. then it is at room temperature. Experiments also showed that tartrazine was effective as a stabilizer at this temperature but to a lesser degree, and that the combination of sodium meta-bisulfite and tartrazine also had a good stabilizing effect.

In still another series of experiments, the solutions were aerated for two hours and then placed in the sunlight. The control discolored and developed a precipitate in thirty-nine days. A solution protected with tartrazine darkened slightly in color but gave no precipitate even after seventy-one days. The solution stabilized by sodium meta-bisulfite had a very dark color and had a heavy precipitate at seventy-one days. When both tartrazine and sodium meta-bisulfite were used as the stabilizing agents, there was only slight darkening at the end of seventy-one days and no precipitate had formed.

In a similar series of experiments in which the sympathomimetic amine was isoproterenol hydrochloride, 100 milliliter aliquots of a solution of 0.2 percent isoproterenol hydrochloride in distilled water were prepared and exposed to sunlight as described above. The same amounts of sodium meta-bisulfite and tartrazine were used as stabilizing agents. The results of this series of experiments are shown in the following table.

Table II

| Solution | Days Exposure Sunlight, Room Temperature | | |
|---|---|---|---|
| | 39 | 46 | 71 |
| Isoproterenol HCl, 0.2% | Sl. brown, sl. ppt. | Darker ppt. | Dark brown heavy ppt. |
| Isoproterenol HCl, 0.2%; Na Meta-bisulfite, 0.2%. | Dark ppt. | do | Deep orange ppt. |
| Isoproterenol HCl, 0.18%; Tartrazine, 0.009%. | Dark, sl. ppt. | do | No change. |
| Isoproterenol HCl, 0.18%; Tartrazine, 0.009%; Na Meta-bisulfite, 0.2%. | Darkened, no ppt. | do | Do. |

As will be seen from the foregoing, tartrazine is a good stabilizer for isoproterenol hydrochloride and can be used effectively with sodium meta-bisulfite.

In a third series of experiments, solutions of 0.5 percent ephedrine sulfate were prepared and tested by the same procedures. These solutions of 0.5 percent ephedrine sulfate proved to be fairly stable with the exception of the solution stabilized with 0.2 percent sodium meta-bisulfite placed in sunlight which turned yellow. The solutions containing tartrazine remained stable.

The hydrogen ion concentrations of solutions of isoproterenol hydrochloride and 1-phenylephrine hydrochloride stabilized with tartrazine were also studied. There were no significant changes in the pH of any of the solutions over a period of seventy-five days.

The stabilizing action of tartrazine was also studied in the presence of small amounts of ferric iron. Solutions of 2 percent 1-phenylephrine were prepared and ferric chloride was added to bring the iron content to 10 parts per million. These solutions were then treated with sodium meta-bisulfite, tartrazine, and combinations of these two stabilizing agents. The results are shown in the following table.

*Table III*

| Solution | Days Exposure Sunlight, Room Temperature | | | |
|---|---|---|---|---|
| | 7 | 9 | 15 | 28 |
| 1-phenylephrine HCl, 2.0%; 10 p.p.m. Fe$^{+++}$. | Stable | Brown | Darker ppt. | Dark brown heavy ppt. |
| 1-phenylephrine HCl, 2.0%; Na Meta-bisulfite, 0.2%; 10 p.p.m. Fe$^{+++}$. | do | do | do | Do. |
| 1-phenylephrine HCl, 1.8%; Tartrazine, 0.009%; 10 p.p.m. Fe$^{+++}$. | do | do | Sl. darker, no ppt. | Brown ppt. |
| 1-phenylephrine HCl, 1.8%; Tartrazine, 0.009%; Na Meta-bisulfite, 0.2%; 10 p.p.m. Fe$^{+++}$. | do | Stable | Sl. Brown, no ppt. | Do. |

As will be seen, amounts of 0.2 percent of sodium meta-bisulfite had little stabilizing effect in the presence of 10 parts per million of ferric iron. Tartrazine was a better stabilizer than sodium meta-bisulfite under the same conditions.

Other studies show that tartrazine is an effective stabilizer of unstable, dilute aqueous solutions of sympathomimetic amines and mixtures thereof when used in amounts ranging from about 0.02 to 0.2 percent by weight.

Other FD and C dyes including some of those having a yellow color were found to have little or no stabilizing action. Tartrazine may be used in the above amounts with other conventional stabilizers such as sodium meta-bisulfite, usually with an improved result. The aqueous solutions of the sympathomimetic amines will contain varying amounts of the amine depending upon its potency but will usually be in the range from 0.1 to 2.5 percent by weight. Other therapeutic agents which might be administered in aqueous solution, along with the sympathomimetic amines, may also be included in the solution.

What is claimed is:
1. A dilute aqueous solution containing 0.1 to 2.5 percent by weight of a sympathomimetic amine of the group consisting of isoproterenol and 1-phenylephrine containing 0.02 to 0.2 percent by weight of tartrazine.
2. A dilute aqueous solution containing 0.1 to 2.5 percent by weight of a sympathomimetic amine of the group consisting of isoproterenol and 1-phenylephrine containing 0.02 to 0.2 percent by weight of tartrazine and 0.1 to 0.2 percent by weight of sodium meta-bisulfite.
3. An aqueous solution containing 0.1 to 2.5 percent by weight of isoproterenol stabilized with 0.02 to 0.2 percent by weight of tartrazine.
4. An aqueous solution containing 0.1 to 2.5 percent by weight of 1-phenylephrine stabilized with 0.02 to 0.2 percent by weight of tartrazine.

References Cited by the Examiner

Dale: J. Am. Pharm. Assoc., vol. 18, No. 7, July 1957, Pract. Pharm. Ed., p. 421.

Merck Index, 7th ed., 1960, pp. 404, 580, 842, and 1013.

West: J. Am. Pharm. Assoc., Practical Ed., July 1947, p. 195.

JULIAN S. LEVITT, *Primary Examiner.*

F. CACCIAPAGLIA, Jr., *Examiner.*